May 3, 1938.  W. H. FURNESS  2,116,307
STEERING DEVICE FOR AUTOMOBILES
Filed May 6, 1935   3 Sheets-Sheet 1

Inventor
William Henry Furness

May 3, 1938.  W. H. FURNESS  2,116,307

STEERING DEVICE FOR AUTOMOBILES

Filed May 6, 1935  3 Sheets-Sheet 2

Inventor
William Henry Furness

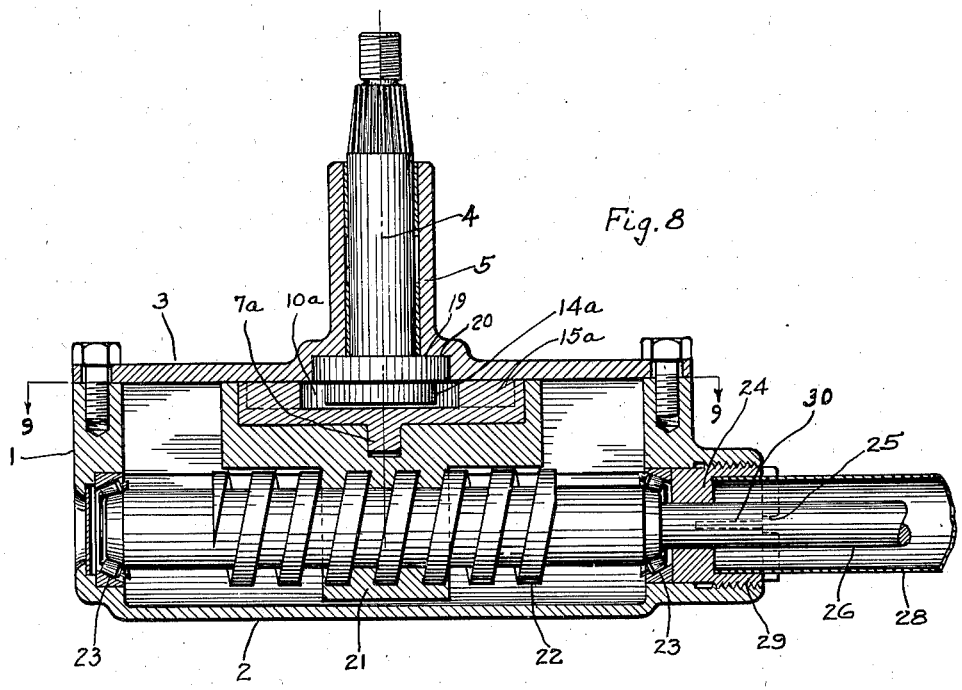
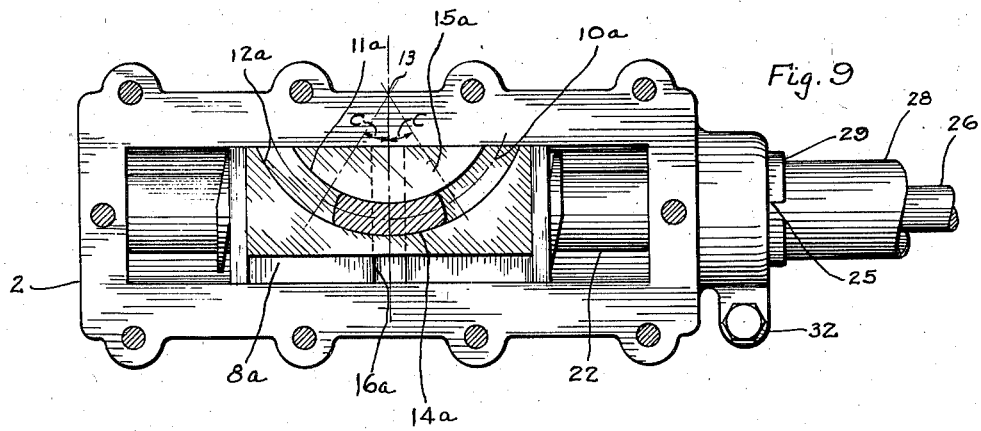

Patented May 3, 1938

2,116,307

UNITED STATES PATENT OFFICE 2,116,307

STEERING DEVICE FOR AUTOMOBILES

William H. Furness, East Riverton, N. J.

Application May 6, 1935, Serial No. 19,951

6 Claims. (Cl. 74—499)

This invention relates to steering devices particularly adapted for use on automobiles.

It is well known that with steering devices as now used on automobiles it is possible to transmit steering movement from the front wheels back to the steering wheel. Should a tire blow out, the forces developed tend to turn or deflect the front wheels and steer the automobile off the roadway out of control. In traveling over a high crown roadway the forces developed on the front wheels likewise tend to turn the front wheels to steer the automobile to the side of the roadway.

To overcome these objections steering devices have been proposed by which a driver could transmit movement from the steering wheel to the front wheels but movement could not be readily transmitted from the front wheels back to the steering wheel. As far as I am aware these devices were not suitable to function at the low steering ratios now used on automobiles, that is, where a comparatively few turns of the steering wheel would effect full steering movement of the front wheels.

One object of my invention is to provide a steering device by which a driver may readily transmit movement from the steering wheel to the front wheels and by which the front wheels will be locked against transmitting movement back to the steering wheel.

Another object is to provide such a steering device which will function at the low steering ratios now used on automobiles.

Figure 1:
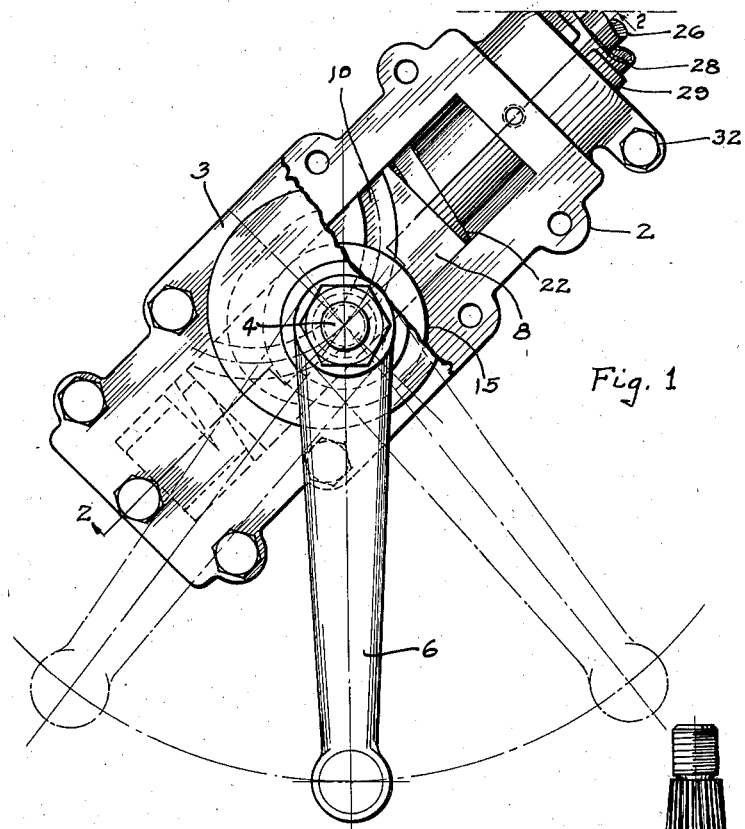

These objects and other advantageous results I attain in the following manner, reference being had to the accompanying drawings in which:

Figure 1 is a side elevation, partly broken away, of a steering device constructed according to my invention.

Figure 2:
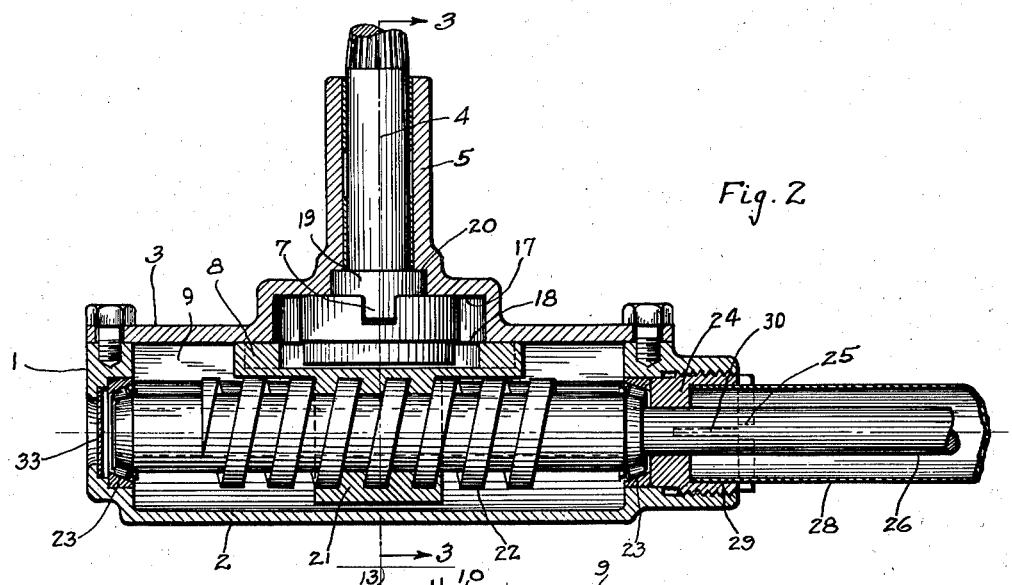

Figure 2 a sectional plan taken on line 2—2 of Figure 1, the rocker arm being omitted.

Figure 3:
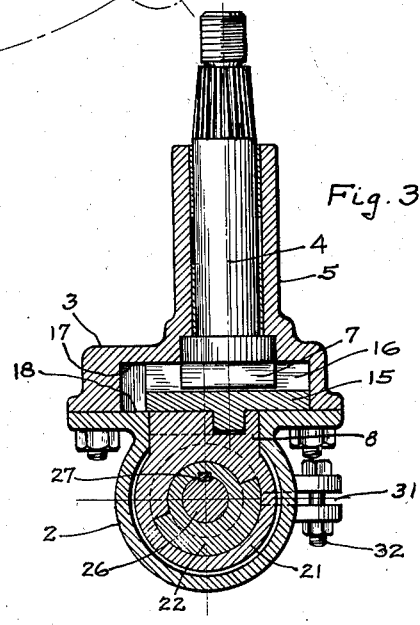

Figure 3 a sectional view taken on line 3—3 of Figure 2.

Figure 4:
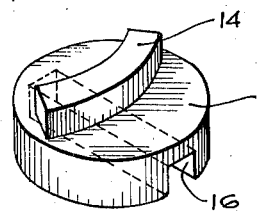

Figure 4 a perspective view of one of the parts shown in Figure 3.

Figure 5:
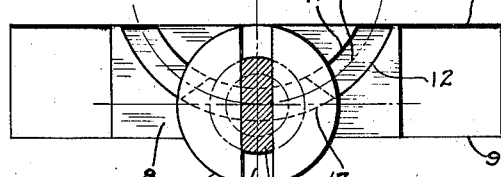

Figure 5 a diagrammatic view of certain of the parts shown in Figure 1, illustrating them in the central position as when the automobile is steered straight ahead.

Figure 6:
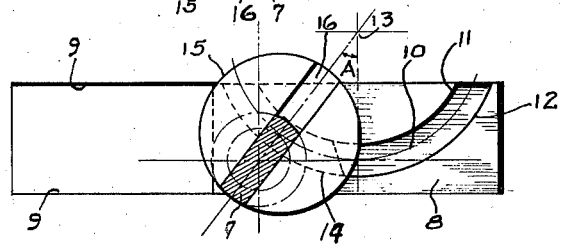

Figure 6 a view similar to Figure 5 showing the parts as when the automobile is steered to the left.

Figure 7:
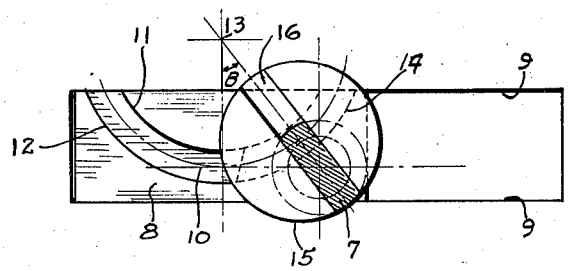

Figure 7 a view similar to Figure 5 showing the parts as when the automobile is steered to the right.

Figure 8 a sectional plan view of a modified arrangement of my invention and

Figure 9 a sectional view taken on line 9—9 of Figure 8.

Referring to the drawings, 1 indicates a casing made up of a housing 2 and a cover 3 secured thereto by suitable bolts. A rocker shaft 4, rotatably mounted in a bearing 5 integral with the cover 3, has its outer end shaped in the usual way to receive a rocker arm 6 of any conventional type. The inner end of the rocker shaft is formed into a rectangular tenon 7 through which rocking movement is transmitted to the shaft.

An actuating member 8 slidably fits between a pair of guides 9 integral with housing 2 and is adapted to be slid crosswise of rocker shaft 4. On one side of actuating member 8 is an arcuate groove 10 forming a pair of opposed cam faces 11 and 12. The arc of the groove is struck from a center 13 in a plane at right angles to rocker shaft 4. An arcuate tenon 14, on one side of a compensating member 15, slidably fits between cam faces 11 and 12. A straight groove 16 on the other side of compensating member 15, receives rectangular tenon 7 on the end of rocker shaft 4. Sliding actuating member 8 crosswise of rocker shaft 4 will cause the rocker shaft to rock and swing its rocker arm to effect a steering movement of the front wheels.

This sliding movement of actuating member 8 causes compensating member 15 to rock and at the same time to move crosswise of rocker shaft 4. Such crosswise movement of actuating member 8 and compensating member 15 is clearly illustrated in Figures 5, 6 and 7. It will be seen that as actuating member 8 is slid, it moves past compensating member 15, and the arcuate cam faces 11 and 12 will cause tenon 14 to follow their curvature, thus continually turning compensating member 15. At the same time compensating member 15 is moved crosswise of rocker shaft 4 due to the rise and fall of the curvature of cam faces 11 and 12 in relation to rocker shaft 4. The straight groove 16 slidably fitting tenon 7, permits this crosswise movement and only the rocking movement is transmitted to rocker shaft 4. Thus compensating member 15 compensates to make this undesired crosswise movement ineffective and transmits only the rocking movement to rocker shaft 4.

To keep the tenons 7 and 14 in their respective grooves 16 and 10 under all strains of transmitting movement, compensating member 15 slidably fits between a face 17 of cover 3 and a face 18 of actuating member 8. This arrangement also takes the inward thrust of rocker shaft 4. The outward thrust is taken by a shoulder 19 against a counterbore 20 in cover 3.

It should be understood that the mechanism by which movement is transmitted from the steering wheel to move actuating member 8 may be varied without altering the function of the parts thus far described.

I have shown an arrangement for transmitting this movement to actuating member 8 in the form of a nut 21 integral with actuating member 8 and fitting a screw 22 rotatable in a pair of tapered roller bearings 23 in the opposite ends of housing 2. Rotating screw 22 will move actuating member 8 lengthwise of the screw.

End play in the roller bearings 23 is taken up by a gland nut 24 having slots 25 to receive a spanner wrench for turning the nut. A steering rod 26 passes through gland nut 24 and has one end keyed at 27 to screw 22 and the other end, shown as broken away, may be connected to the steering wheel in any suitable manner. A steering column 28 which houses the steering rod in the usual way, may be attached to the gland nut 24 by clamping its end in a nut socket 29 slit at 30 to permit its walls being closed in over the steering column and thus securely clamp it in place. The gland nut end of housing 2 is slit at 31 and is closed in by tightening a bolt 32 to clamp gland nut 24 in place. This clamping action will also close in nut socket 29 around the end of the steering column to clamp it in place.

The interior of the casing is filled with a lubricant and may be sealed between the housing 2 and cover 3 by a suitable gasket or cement. The free end of housing 2 is also sealed by a disk 33 press fitted in the housing.

In operation the driver of an automobile turning the steering wheel, will effect rotation of steering rod 26 and screw 22 which in turn will slide actuating member 8 between its guides 9 crosswise of rocker shaft 4. This movement of actuating member 8 will cause arcuate tenon 14 to follow the curvature of cam faces 11 and 12. When moved from the central position shown as Figure 5, to the right as shown in Figure 6, the tenon will follow the curvature of cam faces 11 and 12 and be thereby rotated through an angle equal to angle A of the arc of cam faces 11 and 12. In this position the distance from the center 13 of the arc, to the center of rocker shaft 4, has increased and compensating member 15 has moved this increased distance crosswise of rocker shaft 4 and always in a radial line toward arc center 13. The sliding fit of straight groove 16 and its rocker shaft tenon 7, being in a radial line to the arcuate tenon 14, permits the crosswise movement of compensating member 15 without effecting movement to the rocker shaft. Only the rocking movement of compensating member 15 is transmitted through straight groove 16 and tenon 7 to rocker shaft 4 to swing its rocker arm 6 for steering the front wheels to the left.

When actuating member 8 is moved from the central position in Figure 5, to the left as shown in Figure 7, compensating member 15 will be rotated in the opposite direction through an angle equal to angle B and will effect rocking of rocker shaft 4 in the opposite direction to steer the front wheels to the right.

It is thus seen that a driver at the steering wheel effecting turning of screw 22 to the right or left will transmit movement to steer the front wheels respectively to the right or left.

Should a force develop from a tire blowout or a bump in the road, tending to deflect the front wheels, the front wheels would be locked against movement by arcuate tenon 14 and cam faces 11 and 12, which may be readily seen by referring to Figures 5, 6 and 7. With the parts in the central position, shown in Figure 5, as when steering the automobile straight ahead, any turning or rocking effort of the rocker shaft would be resisted by tenon 14 bearing against opposed cam faces 11 and 12, thus locking the rocker shaft and the front wheels against movement. When steering the automobile to the left the parts would be in the position shown in Figure 6 and any effort to turn rocker shaft 4 would likewise be resisted by tenon 14 bearing against opposed cam faces 11 and 12, locking the front wheels against movement by forces from the roadway. When steering the automobile to the right the parts would take the position shown in Figure 7 and in a similar manner tenon 14 bearing against opposed cam faces 11 and 12 would prevent turning of rocker shaft 4 by any forces applied at the front wheels.

It is thus seen that the front wheels will be locked against transmitting steering movement back to the steering wheel, that steering movement may be readily transmitted from the steering wheel to the front wheels, and that the parts will function equally well at any desired steering ratio.

In Figures 8 and 9 I have shown a modified arrangement of parts to perform the same function as the parts shown in Figures 1 to 7. In this arrangement one side of a compensation member 15a has an arcuate groove 10a to provide opposed cam faces 11a and 12a to slidably receive an arcuate tenon 14a on the end of rocker shaft 4. The actuating member 8a has a straight groove 16a to slidably receive a straight tenon 7a on the other side of compensating member 15a. Actuating member 8a is slid in casing 3a by a screw and nut connection 21 and 22. In all other respects the arrangement is similar to the arrangement shown in Figures 1 to 7.

In operation, steering movement is transmitted through screw 22, to slide actuating member 8a crosswise of rocker shaft 4. This will move compensating member 15a with it, crosswise of rocker shaft 4 and cause arcuate tenon 14a on rocker shaft 4 to follow the curvature of arcuate cam faces 11a and 12a. The angle through which the rocker shaft will turn is equal to angle C of the arc of groove 10a. As the compensating member 15a is moved past rocker shaft 4 lengthwise of screw 22, it is also moved at right angles to the screw, due to the center line of the groove 10a being in fixed relation to the center line of rocker shaft 4 for any position of compensating member 15a. The sliding fit between straight groove 16a on actuating member 8a, and straight tenon 7a on the compensating member 15a, permits this movement at right angles to the screw. Only the rocking movement is thus transmitted to the rocker shaft to steer the front wheels.

While I have described my invention as taking a particular form, it will be understood that I am at liberty to make such changes and alterations as fairly come within the scope of the appended claims.

Having thus described my invention, what I claim as new and desire to secure by Letters Patent is:—

1. In a steering mechanism an actuating member having cam faces, means for moving the actuating member, a rocker shaft, and a compensating member movable crosswise of the shaft and having a part slidably engaging the cam faces to receive rocking movement therefrom and a part engaging the rocker shaft to effect rocking thereof.

2. In a steering mechanism an actuating member having arcuate cam faces, means for moving the actuating member, a rocker shaft, and a compensating member movable crosswise of the shaft and having a part engaging the cam faces to receive rocking movement therefrom and a part engaging the rocker shaft to effect rocking thereof.

3. In a steering mechanism, an actuating member having an arcuate cam groove, means for moving the actuating member, a compensating member having a portion on one side slidably fitting the groove and on the other side a straight groove normal to the arcuate groove, and a rocker shaft rotatable in the casing and having its end slidably fitting the straight groove.

4. In a steering mechanism the combination of a steering rod, a rock shaft having a tenon on its end portion, an actuating member having an arcuate slot, and a connecting member between the actuating member and rock shaft having a slot fitting said tenon on the rock shaft and an arcuate tenon fitting the arcuate slot in the actuating member, and means connecting the actuating member to the steering rod.

5. In a steering mechanism the combination of a steering rod, a rock shaft having an arcuate tenon at its end portion, an actuating member, means connecting said actuating member to the steering rod, a connecting member between said rock shaft and actuating member having an arcuate slot in which the arcuate tenon of the rock shaft fits, and a connection between said actuating and connecting members comprising a tenon on one member and a cooperating slot in the other member.

6. In a steering mechanism the combination of a steering rod, a rock shaft, an actuating member, means connecting said actuating member to the steering rod, a compensating member, arcuate tongue and groove means connecting said compensating member with the rock shaft, and straight tongue and groove means connecting said compensating member with the actuating member.

WILLIAM H. FURNESS.